W. P. BABCOCK.
DIRECTION INDICATOR FOR MOTOR VEHICLES.
APPLICATION FILED JAN. 15, 1919.
1,326,831.
Patented Dec. 30, 1919.
3 SHEETS—SHEET 1.
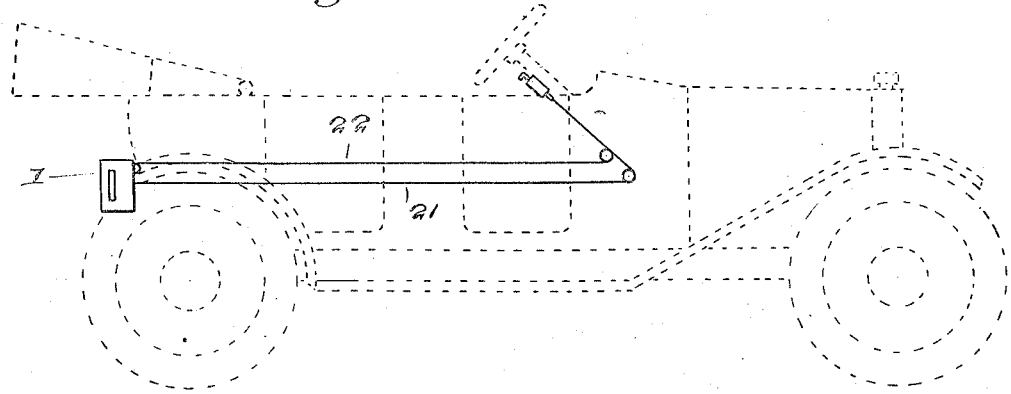
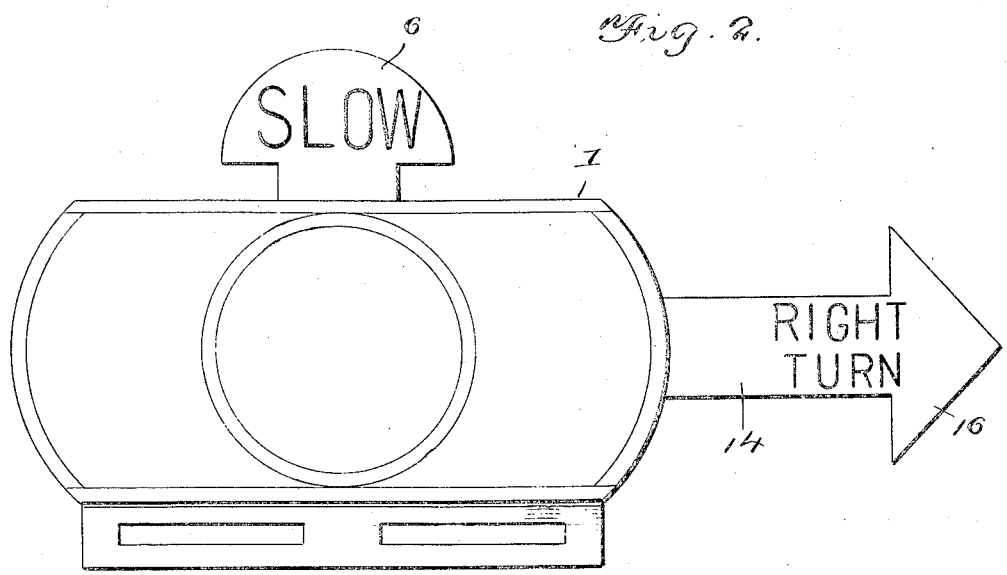
Inventor
W. P. Babcock
Witnesses
E. R. Ruppert
By Victor J. Evans
Attorney

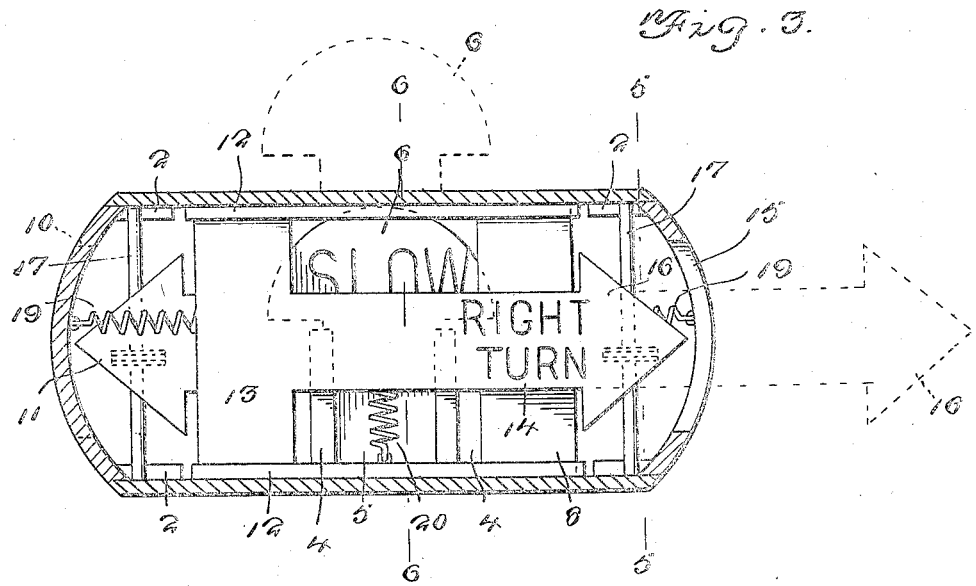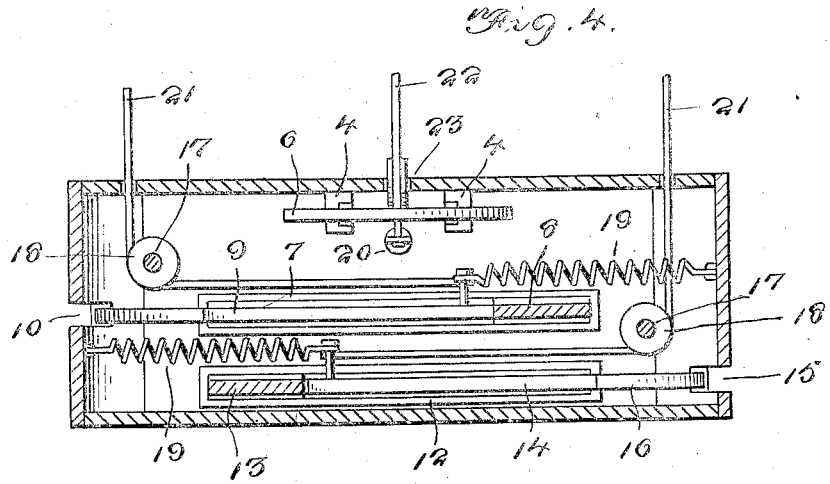

W. P. BABCOCK.
DIRECTION INDICATOR FOR MOTOR VEHICLES.
APPLICATION FILED JAN. 15, 1919.

1,326,831.

Patented Dec. 30, 1919.
3 SHEETS—SHEET 3.

Witnesses
E. R. Ruppert.

Inventor
W. P. Babcock
By Victor J. Evans
Attorney

UNITED STATES PATENT OFFICE.

WILLIAM P. BABCOCK, OF ELYRIA, OHIO.

DIRECTION-INDICATOR FOR MOTOR-VEHICLES.

1,326,831. Specification of Letters Patent. Patented Dec. 30, 1919.

Application filed January 15, 1919. Serial No. 271,255.

*To all whom it may concern:*

Be it known that I, WILLIAM P. BABCOCK, a citizen of the United States, residing at Elyria, in the county of Lorain and State of Ohio, have invented new and useful Improvements in Direction-Indicators for Motor-Vehicles, of which the following is a specification.

This invention relates to improvements in direction indicating apparatus for motor vehicles and has particular application to a hand controlled apparatus of the class described.

In carrying out the present invention it is my purpose to provide direction indicating apparatus for motor vehicles whereby the driver of the signal equipped vehicle may indicate to the drivers of other vehicles and to pedestrians the manner in which he is about to steer his vehicle, thereby enabling such pedestrians and other drivers to govern themselves according to the circumstances of the case.

It is also my purpose to improve and simplify the general construction of apparatus of the type set forth and to provide a device which may be manufactured and marketed at small cost, which may be conveniently installed on any motor vehicle without necessitating any material changes in the construction of the vehicle, and which will embody comparatively few parts and these so arranged and correlated as to reduce the possibility of derangement to a minimum.

In the accompanying drawing:—

Figure 1 is a diagrammatic side elevation showing my invention installed in a motor car;

Fig. 2 is a rear elevation of the casing of the apparatus;

Fig. 3 is a longitudinal sectional view therethrough taken on a vertical plane;

Fig. 4 is a similar view taken on a horizontal plane;

Figure 5:
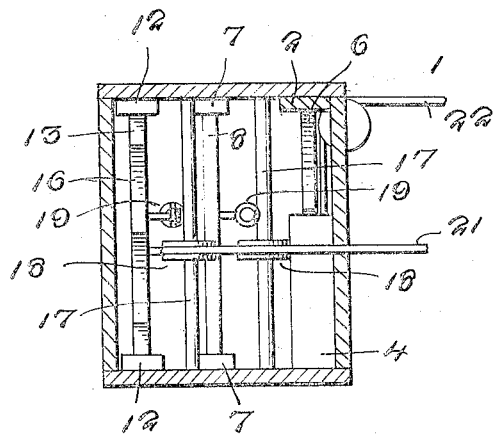
Figs. 5 and 6 are cross sectional views.
Figure 6:
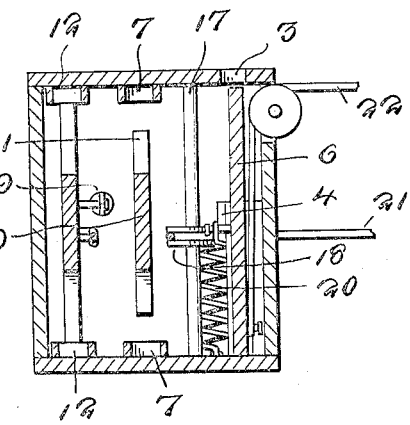
Figure 7:
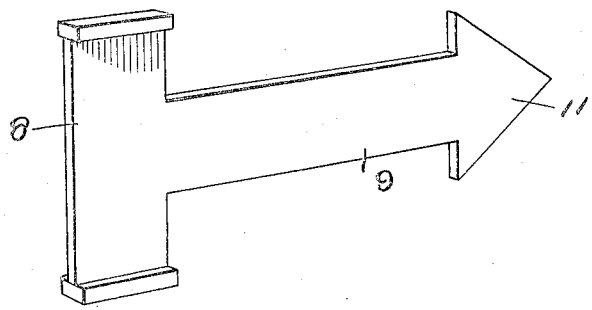
Figs. 7 and 8 are views of details of the invention.
Figure 8:
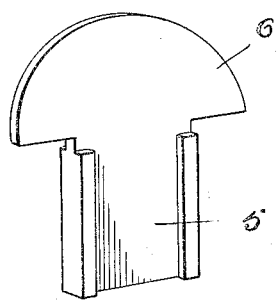

Referring now to the drawing in detail 1 designates a casing embodying, in the present instance, top and bottom and side walls and curved end walls. In the present instance, one of the side walls is formed with an inwardly projecting block 2 arranged at the junction of the curved edges of the side walls with the straight edges thereof and through these blocks 2 and the other side wall is passed bolts that act to secure the side walls in proper relative position. The top and bottom walls and also the curved end walls are secured to the blocks 2 by screws or other appropriate fastening devices thereby enabling all of the walls constituting the casing to be properly held in casing formation. In the top wall of the casing 1 adjacent to one side wall is a slot 3 and suitably secured to the inner face of the side wall adjacent to the slot are vertically disposed guides 4 spaced apart in parallelism. Slidably mounted between the guides 4 is a tongue 5 and suitably secured to the upper end of the tongue 5 or cast integral therewith as desired is a signal blade 6 adapted to be projected through the slot 3. In this instance, the word "Slow" is inscribed on the blade 6.

Bolted or otherwise secured to the inner sides of the top and bottom walls respectively of the casing 1 are guide channels 7 and slidably mounted within the guide channels 7 is a cross plate 8 having one side edge formed with a tongue 9 adapted for sliding movement through a slot 10 formed in one end wall of the casing. On the outer end of the tongue 9 is a signal blade 11 and, if desired, the signal blade and tongue carrying the same may have suitable indicia inscribed thereon, such, for instance, as the words "Left turn." 12—12 designates a second set of horizontally disposed guides and these guides are secured to the respective top and bottom walls of the casing 1 and are arranged in a plane parallel with the plane of the guides 7. Slidably mounted within the guides 12 are the ends of a cross plate 13 and integral with the outer edge of the cross plate 13 is a tongue 14 that projects outwardly through a slot 15 formed in the other end wall of the casing 1. On the outer end of the tongue 14 is a signal blade 15 and, if desired, the words "Right turn" or other indicia may be inscribed on the signal plate 16. Journaled in the top and bottom walls of the casing 1 and arranged behind the cross plates 8 and 13 respectively are vertical shafts 17 and fixed upon each shaft 17 is a guide sheave 18.

Arranged behind the plates 8 and 13 respectively, are coil expansion springs 19 each having one end connected with the adjacent plate and the other end fastened to one end wall of the casing. These springs act to hold the plates and signal blades in normal position and to restore the same to such position succeeding the operation of the blades to signaling position. 20 designates a vertically disposed retractile spring having one end fastened to the bottom wall of the casing and the other end secured to the tongue 5. The spring 20 acts to hold the tongue 5 and the blades 6 normally in non-signaling position and to restore the same to such position. Trained over the guide sheave 18 are cables or other flexible elements 21 having the inner ends thereof connected with the plates 8 and 13 respectively and the other end extending along the frame of the vehicle and terminating within convenient reach of the driver of the vehicle. 22 designates a cable that has one end passed through an opening 23 formed in one side wall of the casing and this end of the cable 23 is connected with the tongue 5, while the other end of the cable 23 is disposed within convenient reach of the driver of the vehicle.

In practice, when the driver of the vehicle is about to make a turn or to slow down he pulls upon the particular cable thereby actuating the corresponding signal blade against the action of its spring to signaling position and upon release of the cable the spring reacts and restores the signal blade to normal position within the casing.

The bottom wall of the casing 1 is provided with a suitable bracket 24 whereby the signaling device may be appropriately fastened to the rear end of the vehicle and, if desired, suitable illuminating devices may be employed in order that the apparatus may be rendered visible at night, although, the use of illuminating devices is not absolutely necessary.

While I have herein shown and described one particular form of my invention by way of illustration, I wish it to be understood that I do not limit or confine myself to the precise details of construction herein described and delineated, as modification, and variation may be made within the scope of the claim and without departing from the spirit of my invention.

I claim:—

A device of the class described, comprising a casing having a slot in each end and in the top and rear wall thereof, a pair of spaced parallel signal blades arranged for horizontal sliding movement in opposite direction to the end slot, the vertically movable signal blade mounted to slide through the slot in the top of the casing, a pair of U-shaped guides secured within the casing for each blade, a coiled spring for each blade, said springs being connected with the casing and with the blade for normally holding the blades in retracted position, vertically disposed rods connecting the opposed walls of the casing and reinforcing the latter, guide pulleys on said rods, an additional guide pulley journaled in the slot in the rear wall of the casing, and a flexible cable for independently moving said blades against the tension of said springs, said cables being trained over said pulleys and terminating within convenient reach of the user.

In testimony whereof I affix my signature.

WILLIAM P. BABCOCK.